United States Patent
Ladous et al.

(10) Patent No.: US 12,297,107 B2
(45) Date of Patent: May 13, 2025

(54) GAS PURIFICATION METHOD AND DEVICE

(71) Applicant: L'Air Liquide, Societe Anonyme pour l'Etude et l'Exploitation des Procedes Georges Claude, Paris (FR)

(72) Inventors: Robin Ladous, Sassenage (FR); Golo Zick, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 336 days.

(21) Appl. No.: 17/784,552

(22) PCT Filed: Nov. 12, 2020

(86) PCT No.: PCT/EP2020/081905
§ 371 (c)(1),
(2) Date: Jun. 10, 2022

(87) PCT Pub. No.: WO2021/115719
PCT Pub. Date: Jun. 17, 2021

(65) Prior Publication Data
US 2023/0019514 A1  Jan. 19, 2023

(30) Foreign Application Priority Data
Dec. 12, 2019  (FR) .................... 1914226

(51) Int. Cl.
*F25J 3/00* (2006.01)
*B01D 53/04* (2006.01)
(Continued)

(52) U.S. Cl.
CPC .......... *C01B 23/0089* (2013.01); *B01D 53/04* (2013.01); *B01D 53/864* (2013.01);
(Continued)

(58) Field of Classification Search
CPC .......... F25J 3/028; F25J 3/029; F25J 2205/60; F25J 2205/62; F25J 2205/66; F25J 2205/68; F25J 2205/72
See application file for complete search history.

(56) References Cited

U.S. PATENT DOCUMENTS 3,599,438 A * 8/1971 Blackwell ............... F25J 3/069
62/235.1
4,717,407 A * 1/1988 Choe ....................... F25J 3/029
210/500.21
(Continued)

FOREIGN PATENT DOCUMENTS

CN  104 176 717  12/2014
CN  105 987 580  10/2016
(Continued)

OTHER PUBLICATIONS

International Search Report and Written Report for PCT/EP2020/081905, mailed Jan. 14, 2021.
French Search Report for FR 1 914 226, mailed Aug. 19, 2020.

*Primary Examiner* — Brian M King
(74) *Attorney, Agent, or Firm* — Justin K. Murray

(57) ABSTRACT

Disclosed is a method for purifying a main gas, in particular helium, from a source gas stream comprising the main gas, a main impurity, in particular nitrogen, and optionally another, secondary impurity, in particular oxygen, the method comprising a step of partial condensation of the gas stream in order to extract therefrom impurities in liquid form, in particular the main impurity, and to produce a gas stream enriched with main gas, characterized in that the method comprises, before the partial condensation step, a step of injecting into the gas stream a compound in which the main impurity of the gas to be treated is soluble and (Continued)

having a saturation vapor pressure lower than the saturation vapor pressure of the main impurity.

4 Claims, 2 Drawing Sheets

(51) Int. Cl.
*B01D 53/86* (2006.01)
*C01B 23/00* (2006.01)
*F25J 3/02* (2006.01)
*F25J 3/06* (2006.01)

(52) U.S. Cl.
CPC .......... *B01D 53/8671* (2013.01); *F25J 3/029* (2013.01); *F25J 3/069* (2013.01); *B01D 2253/108* (2013.01); *B01D 2256/18* (2013.01); *B01D 2257/102* (2013.01); *B01D 2257/104* (2013.01); *B01D 2257/108* (2013.01); *B01D 2257/702* (2013.01); *C01B 2210/0025* (2013.01); *C01B 2210/0031* (2013.01); *C01B 2210/0045* (2013.01); *C01B 2210/0046* (2013.01); *C01P 2006/80* (2013.01); *F25J 3/028* (2013.01); *F25J 2205/60* (2013.01); *F25J 2205/66* (2013.01); *F25J 2205/68* (2013.01); *F25J 2205/72* (2013.01)

(56) References Cited

U.S. PATENT DOCUMENTS

| | | | |
|---|---|---|---|
| 5,914,455 A * | 6/1999 | Jain | B01D 53/0462 |
| | | | 95/122 |
| 2016/0285340 A1* | 9/2016 | Hiwa | F04D 29/083 |
| 2018/0238618 A1 | 8/2018 | Demolliens et al. | |
| 2018/0335255 A1* | 11/2018 | Barjhoux | F25J 3/0257 |

FOREIGN PATENT DOCUMENTS

| CN | 205 933 231 U | 2/2017 |
|---|---|---|
| FR | 3 035 656 | 11/2016 |
| JP | 2012 031 049 | 2/2012 |

* cited by examiner

[Fig. 1]
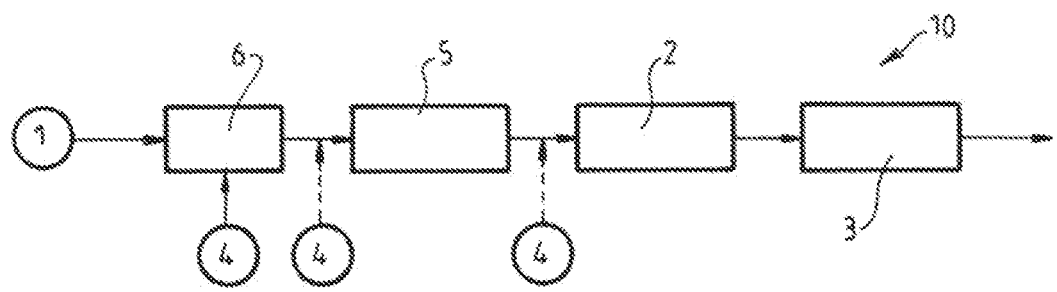
[Fig. 2]
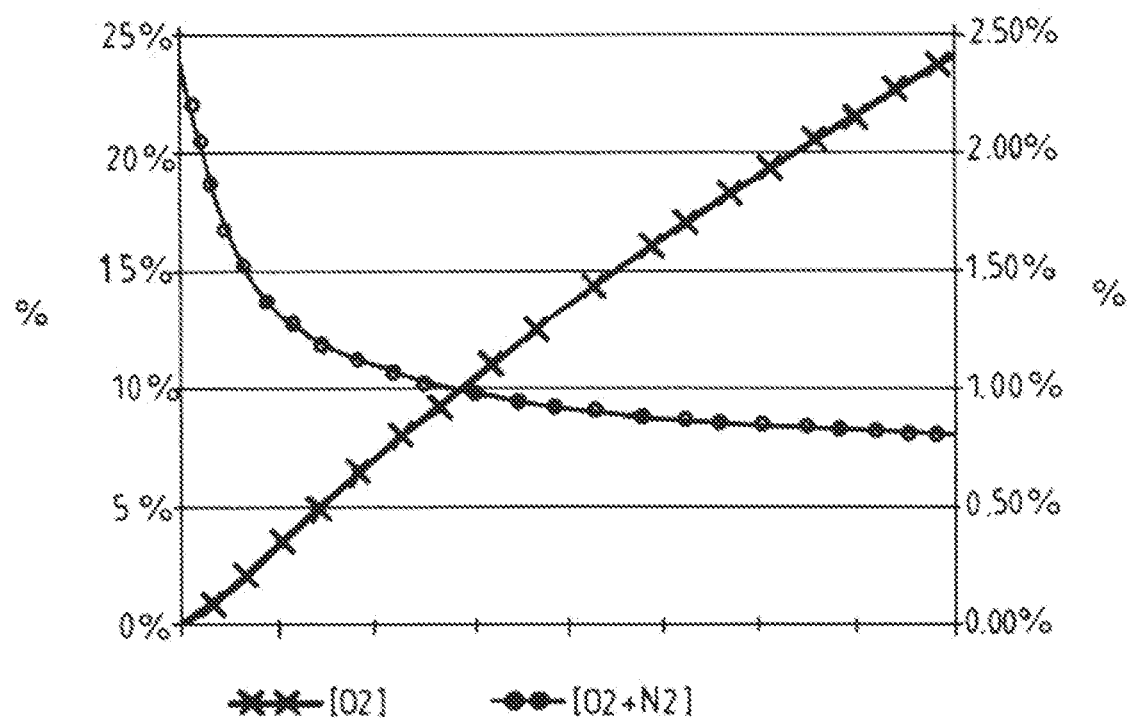

[Fig. 3]
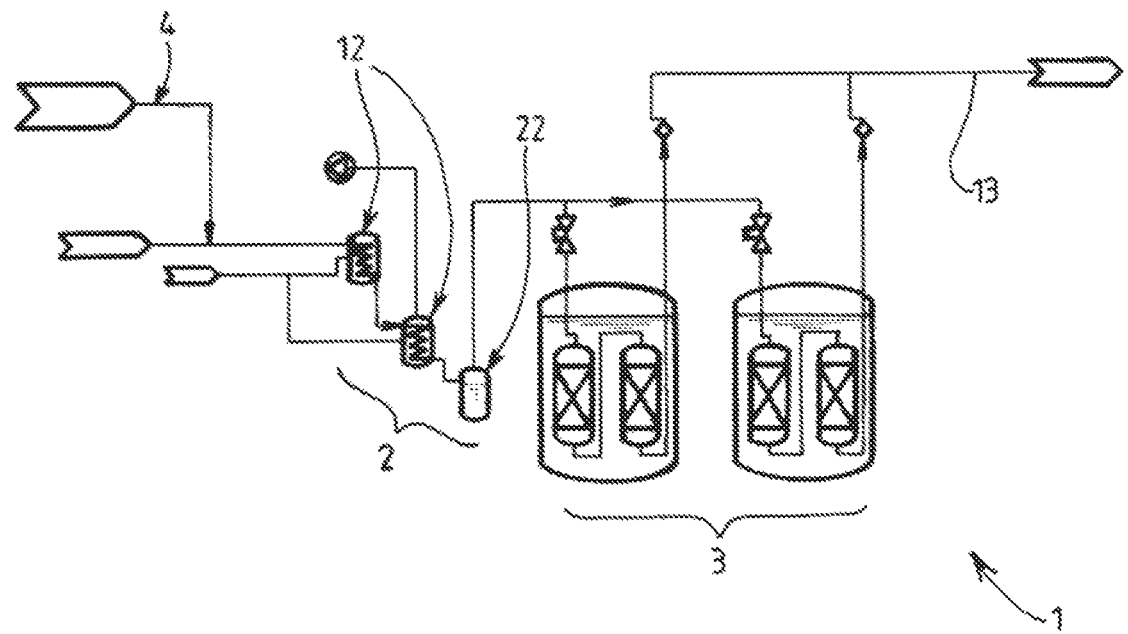
[Fig. 4]
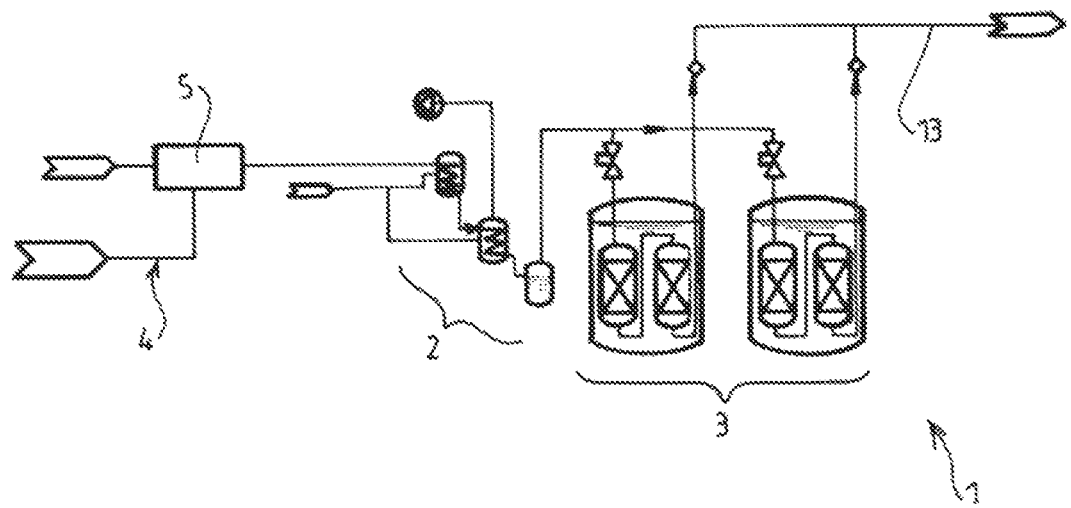

GAS PURIFICATION METHOD AND DEVICE

CROSS-REFERENCE TO RELATED APPLICATIONS

This application is a § 371 of International PCT Application PCT/EP2020/081905, filed Nov. 12, 2020, which claims § 119 (a) foreign priority to French patent application FR1914226, filed Dec. 12, 2019.

BACKGROUND

Field of the Invention

The invention relates to a gas purification process and device.

The invention relates more particularly to a process for the purification of a main gas, in particular helium, starting from a source gas stream comprising the main gas, a main impurity, in particular nitrogen, and optionally another secondary impurity, in particular oxygen, the process comprising a stage of partial condensation of the gas stream in order to extract therefrom impurities in the liquid form, in particular the main impurity, and to produce a gas stream enriched in main gas.

Related Art

In gas purification processes, it is common to use a "washing" or "scrubbing" which, by an absorption phenomenon, makes it possible to withdraw impurities contained in a gas by absorption in the liquid phase. The impurities are preferentially soluble in the liquid.

Helium is obtained commercially virtually exclusively from a mixture of volatile components of natural gas, this mixture comprising, as well as helium, typically methane, nitrogen, traces of hydrogen, argon and other noble gases. It is theoretically possible to obtain helium in the atmosphere but this is not economical due to the low concentrations (concentration of helium in the air of the order of 5.2 ppmv).

Helium is thus generally obtained by purification of a gas flow or stream produced by another source and containing helium and impurities of the nitrogen and oxygen type in particular. These impurities can be purified using cryogenic adsorption, operating at temperatures of less than 100 K, typically from 60 K to 80 K.

When the amount of nitrogen and oxygen is relatively high (typically greater than 1.5% by volume of the mixture), and in order to reduce the volume of the cryogenic adsorbers, it is sometimes preferable to install a stage of liquid condensation of these impurities in the gas to be recovered. This condensation can be carried out in one or more stages, in order to reduce the concentration of the impurities down to their equilibrium vapor pressure at the temperature/pressure pair used in these exchangers.

Thus, the procedure for the liquefaction of helium is generally connected downstream of a process for the purification of helium comprising a combination of cryogenic processes: partial condensation, and adsorption process(es). This is because, in order to prevent the undesirable condensation during a procedure for the liquefaction of helium, the concentration of the impurities in the helium stream to be liquefied must not exceed a low value, preferably of 10 ppmv.

The condensation stage is also used to cool the gas stream before the cryogenic adsorption stage.

Typically, condensation temperatures of 60 K to 80 K are used. This condensation can be carried out by using, for example, cooling with liquid nitrogen at a pressure close to atmospheric pressure, and/or by using liquid nitrogen at a pressure lower than atmospheric pressure. The pressure lower than atmospheric pressure is then maintained by means of a vacuum pump, in order to achieve a negative pressure typically of less than minus 500 mbarg.

At the pressure of the gas stream, the condensation temperature then determines the residual concentration of impurity to be treated in the adsorbers.

The operation of the adsorbers preferably includes a trapping phase, during which the impurities are adsorbed on adsorbents (typically zeolites, for example 13X, or other type of adsorbent). When the adsorbent is saturated (or at a predetermined degree of saturation), the adsorbent is regenerated, that is to say that the trapped impurities are desorbed, typically by reducing the pressure therein, and/or by increasing the temperature and by flushing them with a clean gas (purge). The greater the amount of impurity to be withdrawn, the greater the volume of adsorbent required for one and the same trapping duration. For an identical adsorbent volume, the greater the amount of impurity, the shorter the trapping time, and the higher the regeneration frequency. This regeneration thus involves a downtime in order to treat the gas stream and also a consumption of utilities (electricity, cryogenic cold source, and the like) necessary for the heating and the cooling of the adsorber.

An example of this type of process is described, for example, in the document FR 3 035 656 A1.

In order to limit the proportion of impurities and thus to limit the volume and the cost of the cryogenic adsorption stage, the known solutions thus consist in condensing the gas stream. However, this can, despite everything, result in nonoptimized adsorber volumes. In particular, this can result in oversizing of the boiler vessels, cold boxes, and the like.

In addition, it may happen that the composition or the flow rate of the gas stream to be purified changes and requires the amount of adsorbent for trapping to be increased. The dimensioned unit, in particular the absorbers, are then undersized. The installation is thus not very flexible.

SUMMARY OF THE INVENTION

One aim of the present invention is to overcome all or some of the disadvantages of the prior art set out above.

To this end, the process according to the invention, moreover in accordance with the generic definition given thereto in the preamble above, is essentially characterized in that it comprises, before the partial condensation stage, a stage of injection, into the gas stream, of a compound in which the main impurity of the gas to be treated is soluble and having a lower saturated vapor pressure than the saturated vapor pressure of the main impurity.

That is to say that the process carries out the washing of a gas by mixing it with another component in the gas state in which the impurities of the gas to be treated are soluble, followed by a purification of the gas by condensation.

Furthermore, embodiments of the invention can comprise one or more of the following characteristics:

- the process comprises, after the partial condensation stage, a stage of purification of the gas stream enriched in main gas via a cryogenic adsorption device, that is to say with an alternating pressure adsorption system at a temperature of less than 100 K and in particular of between 60 and 80 K, the injection stage comprises an injection of gaseous oxygen into the gas stream, the injection stage increases the proportion of oxygen in the gas stream to a value of between 0.5% and 10% by volume and in particular between 2% and 10% by volume, the process comprises, before the partial condensation stage, at least one upstream purification stage and in that the injection stage is carried out during the upstream purification stage and/or upstream and/or downstream of the upstream purification stage, the at least one upstream purification stage comprises at least one from: an oxidation stage using a catalytic reactor providing reaction between, on the one hand, one or more secondary impurities, such as hydrogen and/or a hydrocarbon, and, on the other hand, oxygen, the source gas stream comprises from 0.5% to 3% by volume of nitrogen, from 90% to 99% by volume of helium, from 2 to 10 ppmv of neon, from 20 to 80 ppm of argon and from 1000 to 2000 ppm of oxygen at a pressure of 9 to 10 bar.

The invention also relates to an installation for the purification of a main gas, such as helium, starting from a gas stream comprising the main gas, a main impurity, such as nitrogen, and optionally at least one other secondary impurity, such as oxygen, the installation comprising a fluid circuit provided with a member for partial condensation of the gas stream in order to extract impurities therefrom, characterized in that the installation comprises a device for injection into the gas stream of a compound in which the main impurity of the gas to be treated is soluble and having a lower saturated vapor pressure than the saturated vapor pressure of the main impurity.

According to other possible distinctive features:

the fluid circuit comprises, downstream of the partial condensation member, a device for purification of the gas stream enriched in main gas of the cryogenic adsorption type, that is to say comprising an alternating pressure adsorption system at a temperature of less than 100 K and in particular of between 60 and 80 K, the purification device comprises a device for separation by alternating pressurization and/or temperature (PSA/TSA/PTSA) comprising several tanks containing adsorbents, such as zeolites, and connected in parallel to the circuit and operating alternately according to adsorption and regeneration phases in order to purify the gas stream, said tanks being cooled in a refrigerant bath, the partial condensation member comprises at least one tank containing a heat exchanger or one bath of liquefied gas placed in heat exchange with a portion of the fluid circuit and a separator for the liquid and gas phases which are obtained after passing through the bath, the liquefied gas of the bath of the partial condensation member comprises liquid nitrogen at a pressure of between two and thirty bar.

The invention can also relate to any alternative device or process comprising any combination of the characteristics above or below within the scope of the claims.

BRIEF DESCRIPTION OF THE FIGURES

Further distinctive features and advantages will become apparent on reading the description below, given with reference to the figures, in which:

FIG. 1 represents a diagrammatic and partial view illustrating an example of structure and of operation of a helium purification installation according to an implementational example of the invention, FIG. 2 represents a curve illustrating the content of pollutants in the gas stream to be purified at the condensation outlet as a function of the amount of one of the compounds which is injected during the injection stage, FIG. 3 represents a diagrammatic and partial view illustrating an example of structure of a helium production installation according to another implementational example of the invention, FIG. 4 represents a diagrammatic and partial view illustrating an example of structure of a helium production installation according to yet another implementational example of the invention.

DETAILED DESCRIPTION OF THE INVENTION

The helium production process illustrated diagrammatically in [FIG. 1] uses a source gas stream 1 comprising at least helium, a main impurity consisting of nitrogen and optionally at least one other secondary impurity comprising, for example, oxygen or another compound.

This process comprises a stage 2 of partial condensation of the gas stream in order to extract therefrom impurities, in particular nitrogen, in the liquid form and to produce a gas stream enriched in helium. The process can next comprise a subsequent stage 3 of purification of the gas stream enriched in helium via a cryogenic adsorption device, that is to say with an alternating pressure adsorption system at a temperature of less than 100 K and in particular of between 60 and 80 K.

As illustrated diagrammatically in dotted lines, the process can also optionally comprise one or more other stages. For example, the process can comprise, before the partial condensation stage 2, an oxidation stage 6 and/or another stage 5 of purification or of treatment of the gas stream. This is because the gas stream to be purified can also contain other impurities, in particular hydrogen and/or other hydrocarbons. For example, the optional oxidation stage 6 can conventionally use a catalytic reactor, site of the reaction between the fuel (for example hydrogen, hydrocarbon or any other compound) and oxygen. Usually, a slight excess of oxygen is maintained (typically a few hundred ppm) in order to ensure that the reaction is complete.

According to a distinctive feature of the invention, the process comprises, before the partial condensation stage 2, a stage 4 of injection into the gas stream of a compound in which the main impurity of the gas to be treated is soluble, and having a lower saturated vapor pressure than this main impurity.

As illustrated, this injection stage 4 can be carried out at the inlet of the condenser of the partial condensation stage 2 and/or before or during a prior stage 5, 6 of purification or of treatment. That is to say that this injection 4 can be carried out directly into the gas stream and/or during an upstream purification stage. In this nonlimiting example, the main impurity is nitrogen and the secondary impurity is oxygen.

Thus, for example, an injection 4 of oxygen can be carried out into the gas stream to be purified which preferably contains a high proportion of nitrogen (for example more than 10% by volume).

Preferably, the injection stage 4 brings this oxygen content to a high excess, which can be several percent (typically from 1% to 10%).

Counterintuitively, this increase in an impurity increases the efficiency of the purification stage 3 by condensation of the impurities to be purified.

In addition, this procedure improves the flexibility of a cryogenic purification installation: for a unit previously dimensioned to treat a given content of impurity, it is possible, by the present process, to increase its capacity for treatment by condensation.

This solution has the effect of making it possible to reduce the cryogenic adsorption volume (cold box, and the like) necessary for the stage of purification by adsorption.

The diagram of [FIG. 1] illustrates different unit operations which can be employed in the context of a helium purification, and also the possible (alternative or cumulative) injection points 4 for the compound (oxygen in this example) facilitating the subsequent condensation of the main impurity (nitrogen in this example).

The cryogenic condensation stage 2 can be configured to lower the content of pollutant from a high value (typically several tens of percent in the gas stream) to a value close to their saturated vapor pressure at the condensation temperature (for example: condensation of nitrogen at atmospheric pressure or under vacuum before an adsorption stage).

The efficiency of this partial condensation stage (that is to say, the degree of reduction in the pollutants after condensation) is thus maximized by modifying the composition of the stream of the gas in order to reduce its saturated vapor pressure so that it is lower at the condensation temperature.

The addition of this compound acts as a "condensation enhancer" which decreases the saturated vapor pressure.

The curves of [FIG. 2] illustrate the change in the content of impurities (sum of the oxygen and of the nitrogen) in percent (curve with circles), in a gas mixture rich in helium, after the condensation stage, and as a function of the excess of oxygen (curve with crosses) in percent.

In this example, on conclusion of the condensation stage 2, the content of nitrogen equivalent ($N_2+O_2$) in the gas to be purified amounts to 2.3% for a very low excess of oxygen (close to 0%). On the other hand, it is noted that this content of nitrogen equivalent ($N_2+O_2$) in the gas to be purified is only approximately 1% when the oxygen content is 10%.

Thus, in order to reduce the fraction of pollutants to be adsorbed (as $N_2$ equivalent), and thus to reduce the necessary volume of the items of absorption equipment and the volume of adsorption, it can thus be advantageous to provide an excess of a secondary impurity (in this example, a content of greater than several percent of oxygen).

For example, on following the curve discussed above, by increasing the excess of oxygen at the catalytic purification outlet to 5% (instead of, for example, 300 ppm usually), the volume of adsorbers necessary can be divided by more than two.

This is because, for one and the same trapping duration, the volume of the adsorber is directly proportional to the amount of substance to be adsorbed (pollutants or impurities).

By virtue of the invention, it is thus possible either to give the installation dimensions with a new economic optimum (reduction in the cost of installation of the items of equipment) or to increase the production capacity in purification for a given installation.

FIG. 3 illustrates an example of an arrangement of such an injection in such a process and such an installation. In this example, the compound (oxygen) in which the main impurity of the gas to be treated (nitrogen) is soluble and having a lower saturated vapor pressure than this main impurity is injected 4 into the gas stream upstream of the partial condensation member 2. This partial condensation member 2 can comprise, for example, two tanks 12 in series each containing a bath of liquefied gas (liquid nitrogen, for example) placed in heat exchange with a portion of the fluid circuit and a separator 22 for the liquid and gas phases which are obtained during this cooling.

Of course, this stage of condensation with nitrogen drawn under vacuum and a separator is not limiting. Thus, it is possible to carry out a condensation without drawing off under vacuum, and/or without a separator and/or by any other appropriate means.

The purified gas stream on conclusion of this partial condensation stage 2 is subsequently sent to the device 3 for cryogenic purification by adsorption. This device 3 for cryogenic purification by adsorption comprises, in this example, several adsorbers, that is to say several tanks containing adsorbents, such as zeolites, and connected in parallel to the circuit and operating alternately according to adsorption and regeneration phases in order to purify the gas stream (PSA/TSA or PTSA, for example), it being possible for said tanks optionally to be cooled in a refrigerant bath. In this nonlimiting example, the device 3 for cryogenic purification by adsorption comprises two pairs of adsorbers.

This device 3 for cryogenic purification by adsorption thus produces, for example, a stream highly enriched in helium (much greater than 99.9% by volume, for example) and another containing the remainder of the elements (essentially nitrogen).

The alternative form of [FIG. 4] differs from that of [FIG. 3] in that the installation 1 comprises, upstream of the partial condensation member 2, a member 5 for upstream purification which is additional, such as a catalytic oxidation, and that the compound (oxygen) in which the main impurity of the gas to be treated (nitrogen) is soluble and having a lower saturated vapor pressure than this main impurity is injected 4 into this purification member 5.

On conclusion of the partial condensation stage 2, the gas stream can have a pressure of between 2 and 30 bar and can comprise between 0% and 7% of nitrogen, between 0% and 2% of the sum of oxygen and of argon, and between 93% and 99% of the sum of helium and of neon.

For example, the initial composition comprised 1.54% of nitrogen, 98.29% of helium, 8 ppm of neon, 42 ppm of argon and 1600 ppm of oxygen, at a pressure of 9.8 bar.

On conclusion of stage 3 of purification by cryogenic adsorption, the gas stream can have a pressure of between 2 and 30 bar and limit the impurities to a few ppm, indeed even less.

The invention has been described in the application to the purification of helium. The process can be applied in the same way to the production of another pure gas (for example neon).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process for purification of a main gas, starting from a source gas stream comprising the main gas, a main impurity, and optionally a secondary impurity, said process comprising:
    injecting oxygen gas into the gas stream, wherein the main impurity is soluble in the oxygen gas and the oxygen gas has a lower saturated vapor pressure than a saturated vapor pressure of the main impurity;
    partially condensing the gas stream; and
    purifying the gas stream enriched in main gas using cryogenic adsorption performed with alternating pressure at a temperature of between 60 and 80 K,
    thereby producing a gas stream enriched in main gas, wherein the main gas is helium, the main impurity is nitrogen, and the optional secondary impurity is oxygen,
    wherein the main gas is helium and the main impurity comprises nitrogen,
    wherein the gas stream has an oxygen value in an amount effective to improve condensation of the main impurity during the step of partially condensing the gas stream, wherein the amount effective to improve condensation of the main impurity during the step of partially condensing the gas stream is between 2% and 10% by volume.

2. The process of claim 1, further comprising, before said step of partially condensing, catalytically oxidizing hydrogen and/or hydrocarbon with oxygen at an oxidation stage using a catalytic reactor, wherein said step of injecting is carried out upstream of, during, and/or downstream of said oxidation stage.

3. The process of claim 1, wherein the source gas stream comprises from 0.5% to 3% by volume of nitrogen, from 90% to 99% by volume of helium, from 2 to 10 ppmv of neon, from 20 to 80 ppm of argon and from 1000 to 2000 ppm of oxygen at a pressure of 9 to 10 bar.

4. An installation for the purification of a main gas, starting from a gas stream comprising the main gas, a main impurity, and optionally at least one secondary impurity, the installation comprising:
    an oxygen gas source;
    a fluid circuit provided with a member for partial condensation of the gas stream in order to extract impurities therefrom; and
    a conduit having an upstream end in fluid communication with the oxygen source and a downstream end in fluid communication with the fluid circuit the conduit being configured to introduce oxygen gas into the fluid circuit such that the oxygen gas mixes with the gas stream, upstream of the partial condensation member,
    wherein the main impurity of the gas to be treated is soluble in the oxygen gas and the oxygen gas has a lower saturated vapor pressure than the saturated vapor pressure of the main impurity, wherein the main gas is helium, the main impurity is nitrogen, and the optional secondary impurity is oxygen,
    wherein the gas stream has an oxygen value in an amount effective to improve condensation of the main impurity when sent to the member for partial condensation of the gas stream, wherein the amount effective to improve condensation of the main impurity when sent to the member for partial condensation of the gas stream is between 2% and 10% by volume,
    wherein the fluid circuit further comprises downstream of the partial condensation member, a cryogenic alternating pressure adsorption system for purification of the gas stream, the cryogenic alternating pressure adsorption system being adapted and configured to operate at a temperature of between 60 and 80 K,
    wherein
    the cryogenic pressure adsorption system is a PSA unit, TSA unit, or a PTSA unit, wherein the cryogenic alternating pressure adsorption system comprises several tanks cooled in a refrigerant bath;
    the several tanks contain the zeolite adsorbents;
    the several tanks are connected to the fluid circuit; and
    the several tanks are connected and adapted to be operated alternately according to adsorption and regeneration phases in order to purify the gas stream,
    wherein the partial condensation member comprises at least one tank containing a heat exchanger or a bath of liquefied gas placed in heat exchange with a portion of the fluid circuit and a separator for the liquid and gas phases which are obtained after passing through the bath,
    wherein the liquefied gas of the bath of the partial condensation member comprises liquid nitrogen at a pressure of between two and thirty bar.

* * * * *